(12) United States Patent
Easton et al.

(10) Patent No.: US 8,472,767 B2
(45) Date of Patent: Jun. 25, 2013

(54) FIBER OPTIC CABLE AND FIBER OPTIC CABLE ASSEMBLY FOR WIRELESS ACCESS

(75) Inventors: Martyn N. Easton, Lenoir, NC (US); James G. Renfro, Jr., Hickory, NC (US); Michael Sauer, Corning, NY (US)

(73) Assignee: Corning Cable Systems LLC, Hickory, NC (US)

( * ) Notice: Subject to any disclaimer, the term of this patent is extended or adjusted under 35 U.S.C. 154(b) by 1083 days.

(21) Appl. No.: 11/437,313

(22) Filed: May 19, 2006

(65) Prior Publication Data
US 2007/0269170 A1 Nov. 22, 2007

(51) Int. Cl.
G02B 6/44 (2006.01)
(52) U.S. Cl.
USPC .......................................................... 385/101
(58) Field of Classification Search
None
See application file for complete search history.

(56) References Cited

U.S. PATENT DOCUMENTS

| | | | |
|---|---|---|---|
| 4,365,865 A | 12/1982 | Stiles | |
| 4,867,527 A | 9/1989 | Dotti et al. | |
| 4,916,460 A | 4/1990 | Powell | 343/853 |
| 5,039,195 A | 8/1991 | Jenkins et al. | |
| 5,042,086 A | 8/1991 | Cole et al. | |
| 5,189,718 A | 2/1993 | Barrett et al. | |
| 5,189,719 A | 2/1993 | Coleman et al. | |
| 5,268,971 A | 12/1993 | Nilsson et al. | |
| 5,301,056 A | 4/1994 | O'Neill | 359/145 |
| 5,339,184 A | 8/1994 | Tang | 359/124 |
| 5,400,391 A | 3/1995 | Emura et al. | 379/59 |
| 5,424,864 A | 6/1995 | Emura | 359/173 |
| 5,444,564 A | 8/1995 | Newberg | 359/187 |
| 5,457,557 A | 10/1995 | Zarem et al. | 359/121 |
| 5,469,523 A | 11/1995 | Blew et al. | |
| 5,557,698 A | 9/1996 | Gareis et al. | |
| 5,598,288 A | 1/1997 | Collar | |
| 5,627,879 A | 5/1997 | Russell et al. | 379/59 |
| 5,640,678 A | 6/1997 | Ishikawa et al. | 455/33.2 |
| 5,644,622 A | 7/1997 | Russell et al. | 455/422 |
| 5,648,961 A | 7/1997 | Ebihara | 370/282 |
| 5,651,081 A | 7/1997 | Blew et al. | |
| 5,677,974 A | 10/1997 | Elms et al. | |
| 5,682,256 A | 10/1997 | Motley et al. | 359/117 |
| 5,818,619 A | 10/1998 | Medved et al. | |
| 5,854,986 A | 12/1998 | Dorren et al. | 455/562 |
| 5,867,485 A | 2/1999 | Chambers et al. | 370/281 |
| 5,913,003 A | 6/1999 | Arroyo et al. | |
| 5,936,754 A | 8/1999 | Ariyavisitakul et al. | 359/145 |
| 5,946,622 A | 8/1999 | Bojeryd | 455/444 |

(Continued)

FOREIGN PATENT DOCUMENTS

| | | |
|---|---|---|
| CA | 2242707 | 1/1999 |
| DE | 2010486 U1 | 9/2001 |

(Continued)

*Primary Examiner* — Uyen-Chau N Le
*Assistant Examiner* — John M Bedtelyon
(74) *Attorney, Agent, or Firm* — C. Keith Montgomery (57) ABSTRACT

A fiber optic cable includes at least one optical fiber and two electrical conductors. A mid-span connection point in the fiber optic cable has a configuration for attaching an opto-electronic component to the optical fiber and electrical conductors. At least one RF antenna is also included and is electrically connected to the opto-electronic component. A fiber optic cable assembly includes a plurality of optical fibers and at least two electrical conductors. An opto-electrical transceiver is in optical and electrical communication with the optical fibers and electrical conductors. An RF antenna is also in electrical communication with the opto-electrical transceiver.

10 Claims, 12 Drawing Sheets

U.S. PATENT DOCUMENTS

| | | | | |
|---|---|---|---|---|
| 5,949,564 | A | 9/1999 | Wake | |
| 5,969,837 | A | 10/1999 | Farber et al. | 359/132 |
| 6,005,884 | A | 12/1999 | Cook et al. | 375/202 |
| 6,016,426 | A | 1/2000 | Bodell | 455/422 |
| 6,127,917 | A | 10/2000 | Tuttle | 340/10.1 |
| 6,128,470 | A | 10/2000 | Naidu et al. | 455/16 |
| 6,150,921 | A | 11/2000 | Werb et al. | 340/10.1 |
| 6,236,789 | B1 * | 5/2001 | Fitz | 385/101 |
| 6,268,946 | B1 | 7/2001 | Larkin et al. | 359/173 |
| 6,292,673 | B1 | 9/2001 | Maeda et al. | 455/522 |
| 6,324,391 | B1 | 11/2001 | Bodell | 455/403 |
| 6,337,754 | B1 | 1/2002 | Imajo | 359/174 |
| 6,353,406 | B1 | 3/2002 | Lanzl et al. | 342/118 |
| 6,374,124 | B1 | 4/2002 | Slabinski | 455/562 |
| 6,405,018 | B1 | 6/2002 | Reudink et al. | 455/20 |
| 6,405,058 | B2 | 6/2002 | Bobier | 455/562 |
| 6,438,301 | B1 | 8/2002 | Johnson et al. | |
| 6,438,371 | B1 | 8/2002 | Fujise et al. | 455/422 |
| 6,477,154 | B1 | 11/2002 | Cheong et al. | 370/328 |
| 6,519,395 | B1 * | 2/2003 | Bevan et al. | 385/100 |
| 6,577,794 | B1 | 6/2003 | Currie et al. | |
| 6,634,811 | B1 | 10/2003 | Gertel et al. | |
| 6,687,437 | B1 | 2/2004 | Starnes et al. | |
| 6,771,862 | B2 | 8/2004 | Karnik et al. | |
| 6,788,666 | B1 | 9/2004 | Linebarger et al. | 370/338 |
| 6,801,767 | B1 | 10/2004 | Schwartz et al. | 455/426.2 |
| 6,807,374 | B1 | 10/2004 | Imajo et al. | 398/115 |
| 6,826,337 | B2 | 11/2004 | Linnell | |
| 6,865,390 | B2 | 3/2005 | Goss et al. | 455/445 |
| 6,883,710 | B2 | 4/2005 | Chung | 235/385 |
| 6,885,846 | B1 | 4/2005 | Panasik et al. | 455/41.2 |
| 6,889,060 | B2 | 5/2005 | Fernando et al. | |
| 6,909,399 | B1 | 6/2005 | Zegelin et al. | 342/463 |
| 6,920,330 | B2 | 7/2005 | Caronni et al. | 455/456.1 |
| 6,931,183 | B2 | 8/2005 | Panak et al. | 385/101 |
| 6,933,849 | B2 | 8/2005 | Sawyer | 340/572.4 |
| 6,965,718 | B2 | 11/2005 | Koertel | 385/101 |
| 6,974,262 | B1 | 12/2005 | Rickenbach | |
| 7,013,087 | B2 | 3/2006 | Suzuki et al. | 398/115 |
| 7,020,473 | B2 | 3/2006 | Splett | 455/456.1 |
| 7,035,512 | B2 | 4/2006 | Van Bijsterveld | |
| 7,039,399 | B2 | 5/2006 | Fischer | 455/422.1 |
| 7,072,586 | B2 | 7/2006 | Aburakawa et al. | 398/115 |
| 7,084,769 | B2 | 8/2006 | Bauer et al. | 340/572.7 |
| 7,106,931 | B2 | 9/2006 | Sutehall et al. | |
| 7,127,176 | B2 | 10/2006 | Sasaki | |
| 7,200,305 | B2 | 4/2007 | Dion et al. | |
| 7,310,430 | B1 | 12/2007 | Mallya et al. | |
| 7,324,730 | B2 | 1/2008 | Varkey et al. | |
| 7,349,633 | B2 | 3/2008 | Lee et al. | |
| 7,366,150 | B2 | 4/2008 | Lee et al. | |
| 2002/0075906 | A1 | 6/2002 | Cole et al. | 370/535 |
| 2002/0181668 | A1 | 12/2002 | Masoian et al. | 379/56.3 |
| 2002/0190845 | A1 | 12/2002 | Moore | 340/10.3 |
| 2003/0045284 | A1 | 3/2003 | Copley et al. | 455/426 |
| 2003/0141962 | A1 | 7/2003 | Barink | 340/10.42 |
| 2003/0161637 | A1 | 8/2003 | Yamamoto et al. | |
| 2003/0165287 | A1 | 9/2003 | Krill et al. | 385/24 |
| 2004/0001719 | A1 | 1/2004 | Sasaki | 398/119 |
| 2004/0017785 | A1 | 1/2004 | Zelst | 370/328 |
| 2004/0047313 | A1 * | 3/2004 | Rumpf et al. | 370/335 |
| 2004/0151503 | A1 | 8/2004 | Kashima et al. | |
| 2004/0203704 | A1 | 10/2004 | Ommodt et al. | 455/422.1 |
| 2004/0204109 | A1 | 10/2004 | Hoppenstein | 455/562.1 |
| 2004/0208526 | A1 | 10/2004 | Mibu | |
| 2004/0218873 | A1 * | 11/2004 | Nagashima et al. | 385/75 |
| 2004/0233877 | A1 | 11/2004 | Lee et al. | 370/338 |
| 2004/0258105 | A1 | 12/2004 | Spathas et al. | 370/539 |
| 2005/0058451 | A1 | 3/2005 | Ross | 398/70 |
| 2005/0226625 | A1 | 10/2005 | Wake et al. | 398/115 |
| 2005/0266797 | A1 | 12/2005 | Utsumi et al. | 455/7 |
| 2005/0266854 | A1 | 12/2005 | Niiho et al. | 455/445 |
| 2005/0271396 | A1 | 12/2005 | Iannelli | 398/193 |
| 2006/0017633 | A1 | 1/2006 | Pronkine | 343/729 |
| 2006/0045054 | A1 | 3/2006 | Utsumi et al. | |
| 2006/0062579 | A1 | 3/2006 | Kim et al. | |
| 2006/0094470 | A1 | 5/2006 | Wake et al. | 455/562.1 |
| 2006/0104643 | A1 | 5/2006 | Lee et al. | |
| 2006/0182449 | A1 | 8/2006 | Iannelli et al. | 398/186 |
| 2006/0189354 | A1 | 8/2006 | Lee et al. | 455/561 |
| 2006/0239630 | A1 | 10/2006 | Hase et al. | |
| 2007/0009266 | A1 | 1/2007 | Bothwell et al. | 398/161 |
| 2007/0058978 | A1 | 3/2007 | Lee et al. | |
| 2007/0166042 | A1 | 7/2007 | Seeds et al. | 398/142 |
| 2007/0253714 | A1 | 11/2007 | Seeds et al. | 398/115 |
| 2008/0013909 | A1 | 1/2008 | Kostet et al. | |
| 2008/0013956 | A1 | 1/2008 | Ware et al. | |
| 2008/0013957 | A1 | 1/2008 | Akers et al. | |
| 2008/0031628 | A1 | 2/2008 | Dragas et al. | |
| 2008/0056167 | A1 | 3/2008 | Kim et al. | |
| 2008/0124087 | A1 | 5/2008 | Hartmann et al. | |
| 2008/0145061 | A1 | 6/2008 | Lee et al. | |

FOREIGN PATENT DOCUMENTS

| | | |
|---|---|---|
| EP | 0477952 A2 | 9/1991 |
| EP | 0477952 A3 | 9/1991 |
| EP | 0461583 B1 | 3/1997 |
| EP | 0993124 A2 | 4/2000 |
| EP | 0993124 A3 | 4/2000 |
| EP | 1363352 A1 | 11/2003 |
| EP | 1443687 A1 | 8/2004 |
| EP | 1501206 A1 | 1/2005 |
| EP | 1511203 B1 | 3/2006 |
| EP | 1693974 A1 | 8/2006 |
| EP | 1742388 A1 | 1/2007 |
| GB | 2323252 A | 9/1998 |
| GB | 2399963 A | 9/2004 |
| GB | 2428149 A | 1/2007 |
| JP | 5260018 A | 8/1993 |
| JP | 9162810 A | 6/1997 |
| JP | 09200840 | 7/1997 |
| JP | 1168675 A | 3/1999 |
| JP | 2000-341744 | 8/2000 |
| JP | 2004-172734 | 6/2004 |
| WO | WO0230141 A1 | 4/2002 |
| WO | WO2004/056019 A1 | 7/2004 |
| WO | WO2004056019 A1 | 7/2004 |
| WO | WO2004/093471 A2 | 10/2004 |
| WO | WO2004/093471 A3 | 10/2004 |
| WO | WO2005/062505 A1 | 7/2005 |
| WO | WO2005/101701 A2 | 10/2005 |
| WO | WO2006/011778 A1 | 2/2006 |
| WO | WO2006/018592 A1 | 2/2006 |
| WO | WO2006/018592 A1 | 2/2006 |
| WO | WO2006/136811 A1 | 12/2006 |
| WO | WO2007/077451 A1 | 7/2007 |
| WO | WO2007/091026 A1 | 8/2007 |

* cited by examiner

FIBER OPTIC CABLE AND FIBER OPTIC CABLE ASSEMBLY FOR WIRELESS ACCESS

BACKGROUND OF THE INVENTION

1. Field of the Invention

The present invention relates generally to fiber optic cable and a fiber optic cable assembly that provide wireless access to a high speed data network without requiring horizontal wiring (either electrical or optical) and expensive converters for each end user. The fiber optic cable and fiber optic cable assembly allow for the installation of a wireless network, or a portion thereof, based on multiple cells all within a single fiber optic cable. A new multi-connection connector is also disclosed that may be used with the present invention.

2. Technical Background

Optical fiber is increasingly being used for a variety of broadband communications including voice, video, and data transmissions. With this increase in the speed of delivery of these transmissions comes the expectation that these higher speeds will be available at all locations, particularly within a working environment, e.g., an office building. While the technology exists for the higher bandwidth, high bandwidth fiber optic cables are not typically distributed to the end users due to the costs of running optical fibers to each desk and the costs of the optical transmitters and receivers that are required for each end user. Additionally, the current horizontal copper cabling provides adequate bandwidth, but it may not provide adequate bandwidth for much longer. While there are some wireless solutions, they tend to be overwhelmed as the users' needs increase, requiring additional access points and the attendant additional wiring for those access points. Thus, there is a need for a high bandwidth solutions that are easier and less expensive to deploy than optical fibers to each end user or additional horizontal copper cabling.

SUMMARY OF THE INVENTION

To achieve these and other advantages and in accordance with the purpose of the invention as embodied and broadly described herein, the invention is directed in one aspect to fiber optic cable that includes at least one optical fiber disposed within and extending along at least a portion of the fiber optic cable, at least two electrical conductors disposed within and extending along at least a portion of the fiber optic cable, and at least one RF antenna disposed within the fiber optic cable to transmit and receive RF signals.

In another aspect, the invention is directed to a fiber optic cable that includes at least one optical fiber disposed within and extending along at least a portion of the fiber optic cable, at least two electrical conductors disposed within and extending along at least a portion of the fiber optic cable, and at least one mid-span connection point, the mid-span connection point having a configuration for attaching an opto-electrical component to the at least one optical fiber and the at least two electrical conductors.

In yet another aspect, the invention is directed to a fiber optic cable that includes at least one optical fiber disposed within and extending along at least a portion of the fiber optic cable, at least two electrical conductors disposed within and extending along at least a portion of the fiber optic cable, at least one opto-electrical transceiver in electrical communication with the at least two electrical conductors and in optical communication with the at least one optical fiber, and at least one RF antenna disposed in the cable and in electrical communication with the at least one opto-electrical transceiver to transmit and receive RF signals.

In another aspect, the invention is directed to a fiber optic cable assembly that includes a fiber optic cable comprising a plurality of optical fibers and at least two electrical conductors, at least one opto-electrical transceiver in electrical communication with the at least two electrical conductors and in optical communication with at least one of the plurality of optical fibers, and at least one RF antenna in electrical communication with the at least one opto-electrical transceiver to transmit and receive RF signals.

Additional features and advantages of the invention are set out in the detailed description which follows, and in part and are readily apparent to those skilled in the art from that description or recognized by practicing the invention as described herein, including the detailed description which follows, the claims, as well as the appended drawings.

It is to be understood that both the foregoing general description and the following detailed description present exemplary and explanatory embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various exemplary embodiments of the invention, and together with the description, serve to explain the principles and operations of the invention.

DETAILED DESCRIPTION OF EXEMPLARY EMBODIMENTS

Figure 1:
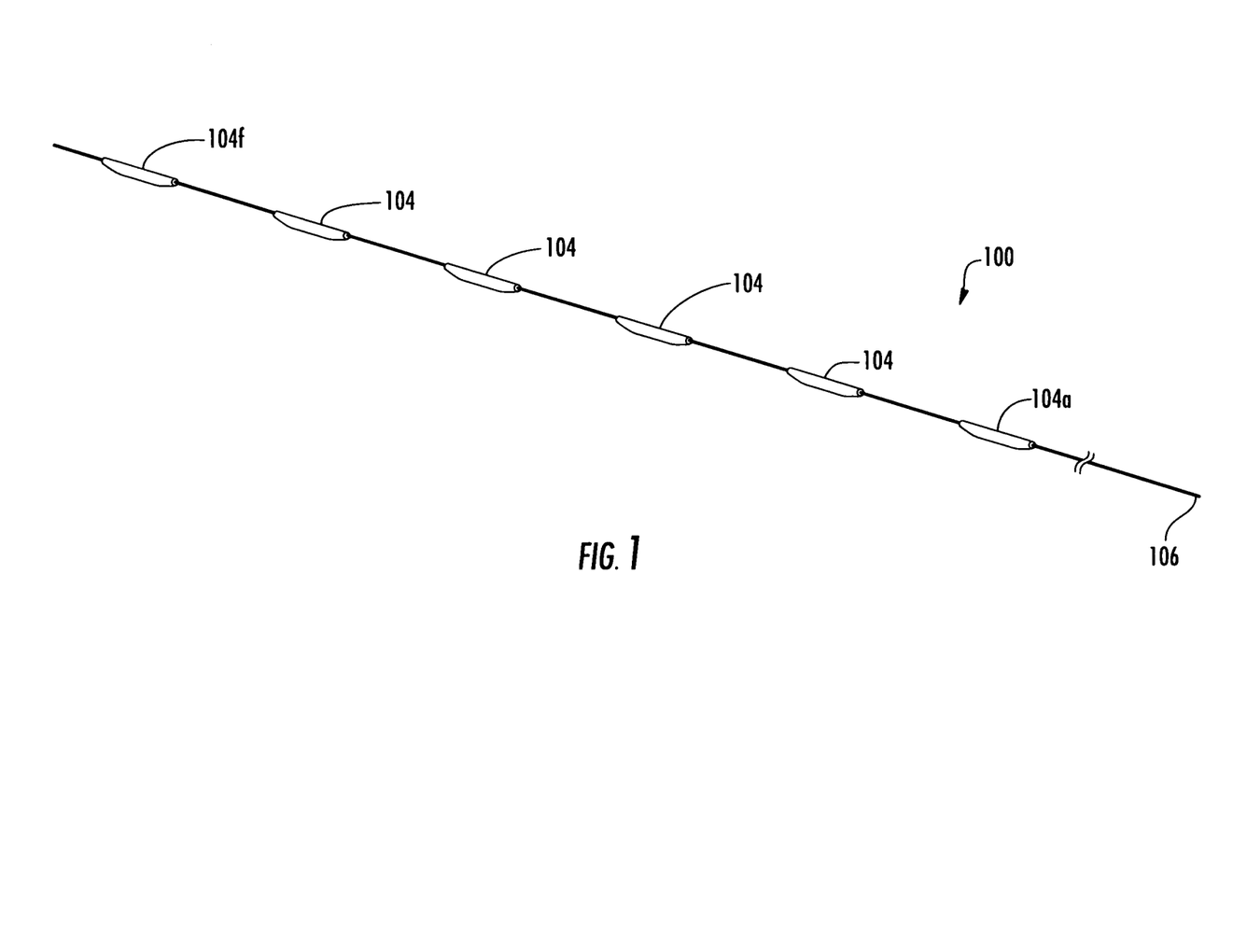
FIG. 1 is a perspective view of one embodiment of a fiber optic cable according to the present invention.
Figure 2:
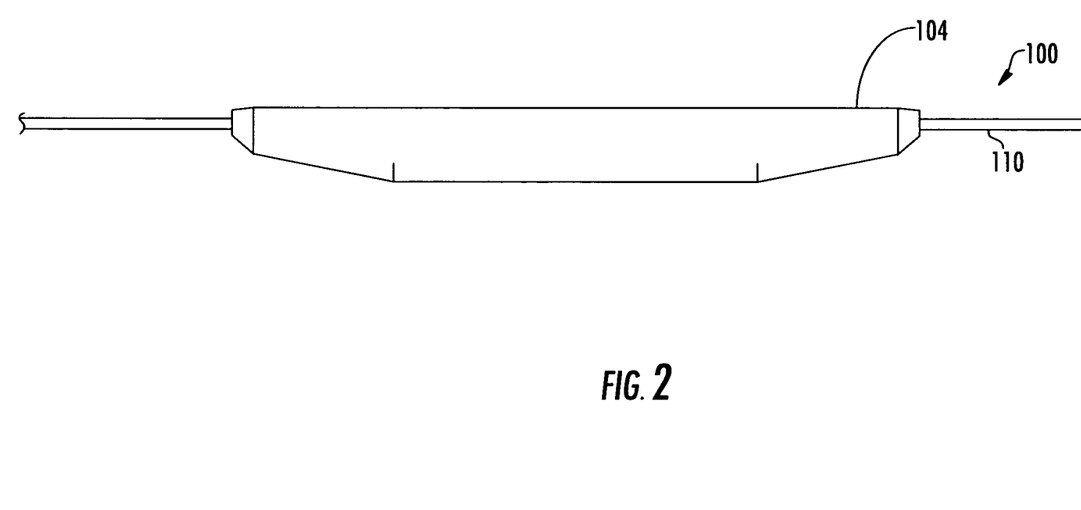
FIG. 2 is an enlarged view of one portion of the fiber optic cable of FIG. 1.
Figure 3:
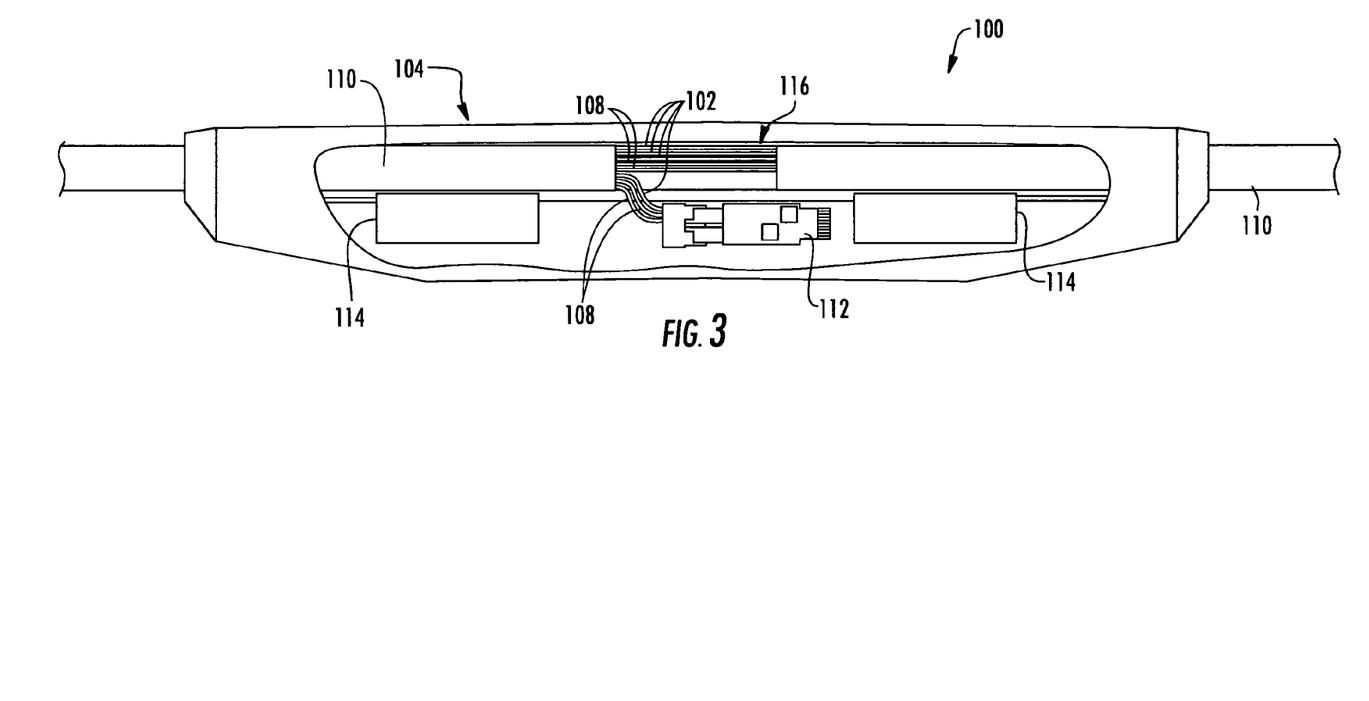
FIG. 3 is a partial cross sectional view of the portion of the fiber optic cable of FIG. 2.

Reference will now be made in detail to exemplary embodiments of the invention, examples of which are described herein and shown in the accompanying drawings. Whenever practical, the same reference numerals are used throughout the drawings to refer to the same or similar parts or features. One embodiment of a fiber optic cable according to the present invention is illustrated in FIGS. 1-3 and is designated generally throughout the following detailed description by the reference numeral 100.

The fiber optic cable 100 preferably has a length of about 48 meters, but could be as short or as long as appropriate, as detailed below. The fiber optic cable 100 has optical fibers 102 (see FIG. 3) that extend along fiber optic cable 100. Spaced along fiber optic cable 100 are connection points 104. The connection points 104 are illustrated to be evenly spaced along fiber optic cable 100 in FIG. 1, but they need not be. Additionally, while six connection points 104 are illustrated to be present in FIG. 1, more or fewer connection points 104 may be present on the fiber optic cable 100. As discussed in more detail below, at least one optical fiber 102 is needed for each of the connection points 104 and usually two optical fibers 102 are needed. Thus, the total number of optical fibers 102 that are present in the fiber optic cable 100 depends on the number of connection points 104 and the number of optical fibers 102 that are required at each connection point 104. Thus, in the event that there are 12 connection points 104 and each connection point 104 required two optical fibers 102, the fiber optic cable would require 24 optical fibers. Other configurations can be similarly determined.

While the optical fibers 102 may extend along the entire length of the fiber optic cable 100, they need not. For example, fiber optic cable 100 has a first end 106 and the optical fiber(s) 102 for the first connection point 104a may be shorter than the optical fiber(s) 102 for the last connection point 104f. Thus, in this instance, since the optical fibers for connection point 104a only extends from the endpoint 106 to connection point 104a, it would not extend to entire length of the fiber optic cable 100. While all of the optical fibers 102 do not have to run the entire length of the fiber optic cable 100, but they may extend the length for easier and more convenient manufacturing of the fiber optic cable 100.

Preferably, the fiber optic cable 100 also has two low voltage electrical conductors or wires 108 that run its length or to at least the last connection point 104. The electrical wires 108 are preferably in the same sheath or cable covering 110 as the optical fibers 102, but need not be. The electrical wires 108 are used to power a transceiver 112 in each of the connection points 104. The transceiver 112 is a opto-electrical transceiver that sends and receives signals as discussed below and the two electrical wires 108 can power all of the transceivers 112 in the fiber optic cable 100. The transceiver 112 is preferably a Small Form Factor (SFF) transceiver that is available from a number of manufacturers.

The fiber optic cable 100 also has at least one RF antenna 114 and more preferably two that are electrically connected to the transceiver 112. It is through the RF antenna(s) 114 that the transceiver 112, and the fiber optic cable 100 in general, send to and receive signals from the network.

The connection point 104 will now be discussed in more detail. The fiber optic cable 100 preferably begins with an appropriate number of optical fibers 102 as discussed above and two electrical wires 108 in one sheath 110. In a post cabling procedure, the connection points 104 are determined and marked. The connection points 104 may be determined to be a preset distance from the first end 106 with a predetermined distance therebetween or they may be located on a custom or need-based basis. Once the locations are determined, the sheath or covering 110 is opened, creating an opening 116 and the appropriate number of optical fibers 102 (one or two, depending on the need) are extracted as is known in the art. The optical fibers are, in the present embodiment, connected directly to the transceiver 112. The two electrical wires 108 are also extracted from the fiber optic cable 100 to connect and power the transceiver 112. As noted above, the two electrical wires 108 are used to power all of the transceivers 112, so appropriate connections should be made. Finally, at least one and preferably two RF antenna 114 are electrically connected to the transceiver (as is known in the art) for sending and receiving RF signals. The opening 116, the RF antennas 114, and the transceiver are then overmolded to encapsulate and secure these elements to the fiber optic cable 100. While a heavy duty heat-shrink may be used, over-molding the components is preferred. It is also possible to use impact resistant housings or shells as well in place of over-molding the elements.

The first end 106 of fiber optic cable 100 can then be connected to a network in an appropriate manner and also to a power supply so that the electrical wires 108 can power the transceivers 112. Once the fiber optic cable 100 is connected to the network, the fiber optic cable 100 can be routed to provide a simple, multi-cell wireless network. As each of the connection points 104 has an opto-electronic transceiver 112, each of the connection points 104 provides a small wireless access point to the network, without having to wire each work station or desk. As more and more access points are needed, another fiber optic cable 100 may be routed in the appropriate locations in a quick and simple manner—simply running one fiber optic cable that requires connection only at one end.

Figure 4:
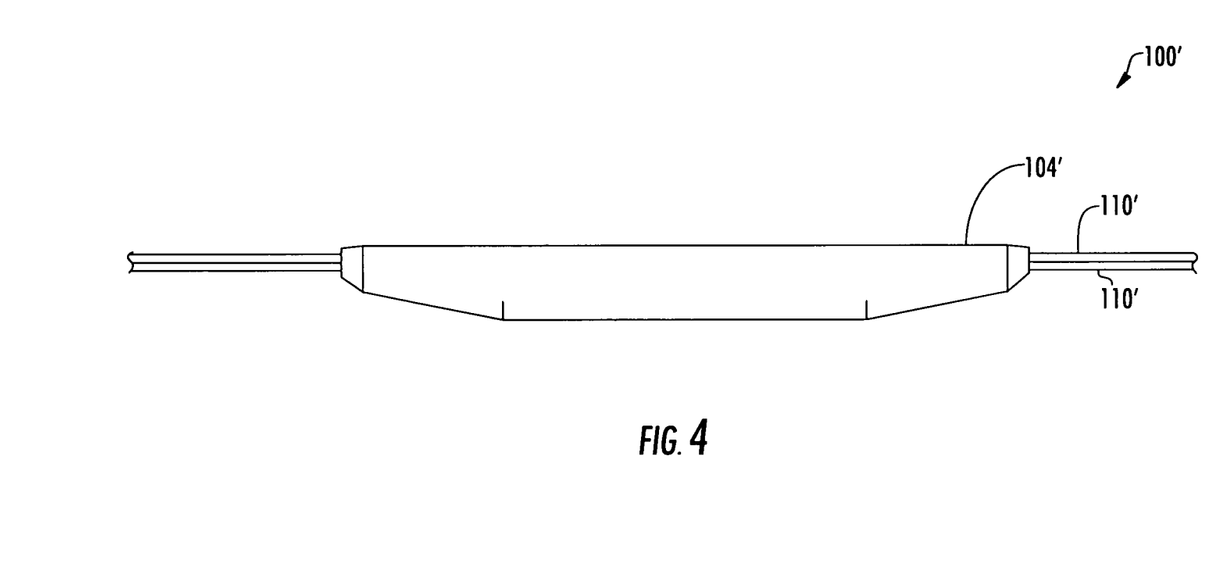
FIG. 4 is an elevational view of a portion of another embodiment of a fiber optic cable according to the present invention.

Another embodiment of a fiber optic cable 100' is illustrated in FIG. 4. The fiber optic cable 100' is the same as fiber optic cable 100 except that the electrical wires are in a separate sheath or covering 110', which is preferably connected to sheath 110 that houses the optical fibers, but is separable therefrom. It may also be that the two sheaths (110, 110') are not at all connected and are two complete separate cables or sheaths that are overmolded together (and thus connected to one another) only at the connection points 104'.

Figure 5:
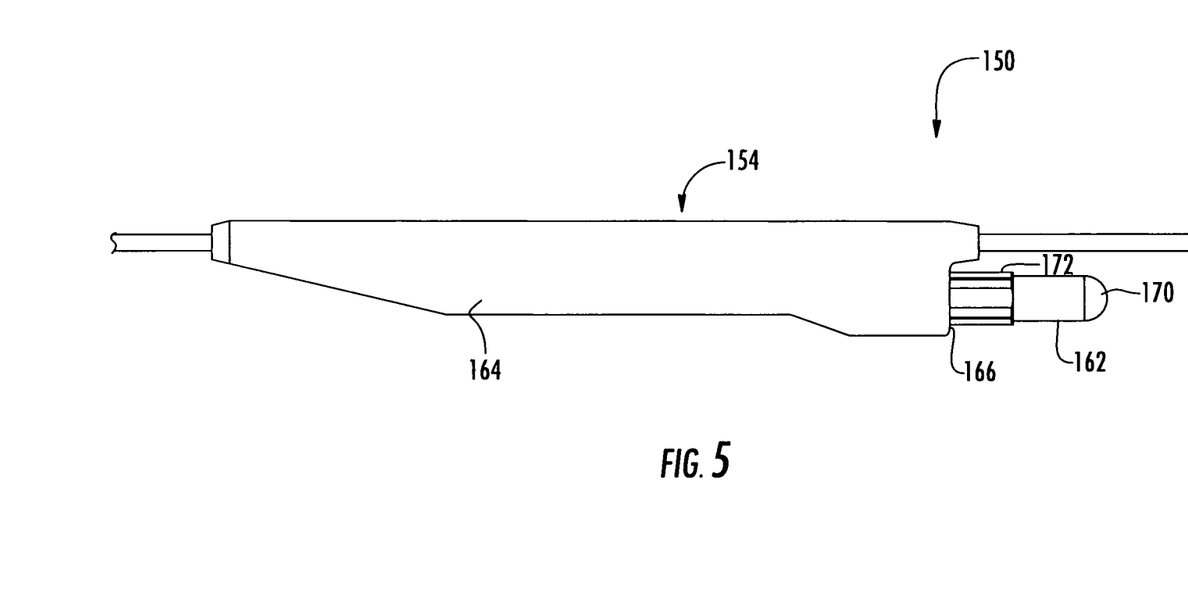
FIG. 5 is an elevational view of a portion of another embodiment of a fiber optic cable according to the present invention.
Figure 6:
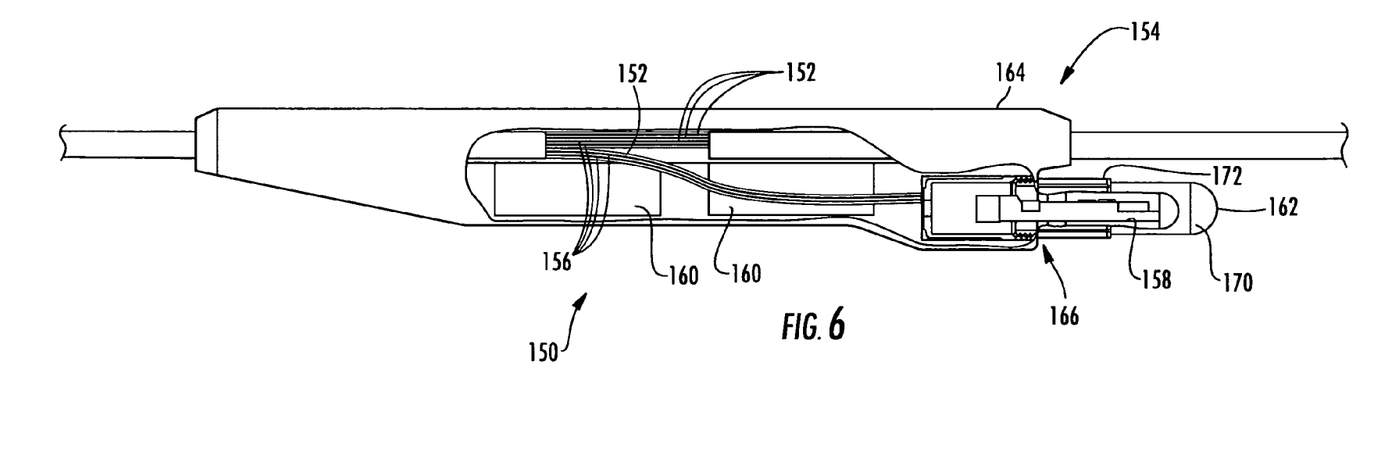
FIG. 6 is a partial cross sectional view of the portion of the portion of the fiber optic cable of FIG. 5.
Figure 7:
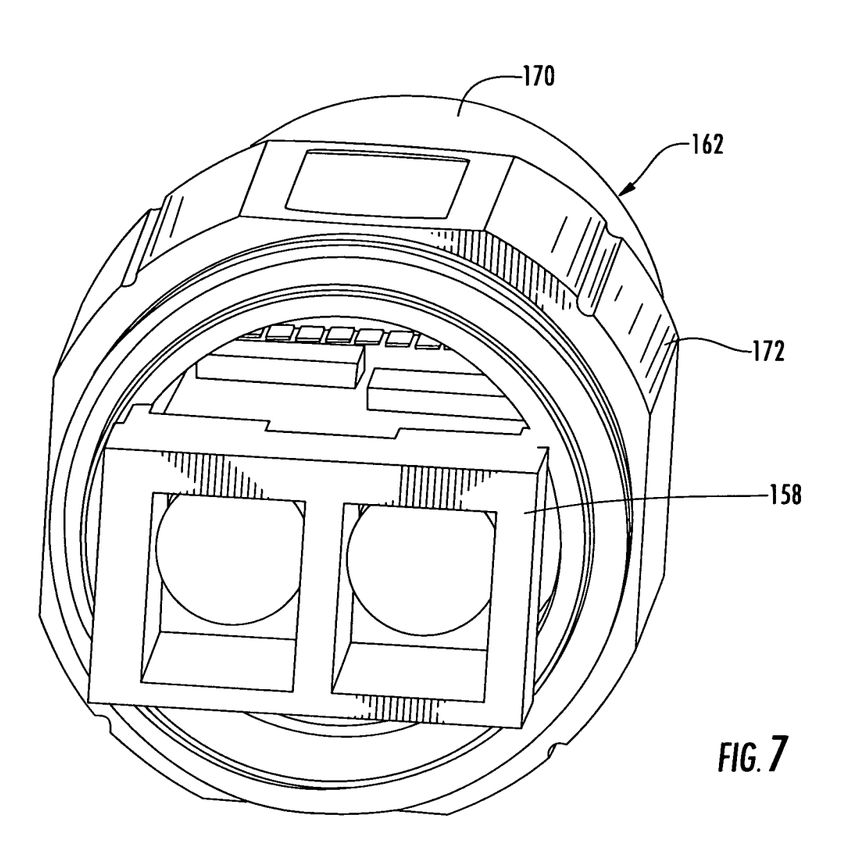
FIG. 7 is an end view of a removable transceiver that can be used with the the fiber optic cable of FIG. 5.

Another embodiment of a fiber optical cable 150 is illustrated in FIGS. 5-7. As with fiber optic cable 100, fiber optic cable 150 may be of any length and have an appropriate number of optical fibers 152 for the number of connection points 154 disposed along the fiber optic cable 150. The fiber optic cable 150 also has at least two electrical conductors 156 to power the transceiver 158. The connection point 154, which is similarly over-molded as discussed above, also contains at least one and preferably two RF antennas 160 that are electrically connected to the transceiver 158 for send and receiving RF signals.

In this embodiment, the opto-electronic transceiver 158 is disposed in an independent module 162, that can be installed at any time after the fiber optic cable is over-molded with the over-molded portion 164. The transceiver 158 is inserted into interface 166, where the opto-electronic transceiver 158 makes electrical contact with the RF antenna(s) 160 and the two electrical conductors 156 as well as an optical connection with the optical fibers 152. It should be noted that the shape or configuration of the opto-electronic transceiver 158 need not be as illustrated in the figures, but it may have any appropriate configuration or shape. Additionally, the specific connections between the interface 166 and the independent module 162 are also not critical to the invention. The independent module 162 may be inserted prior to installation of the fiber optical cable 150 or once it is installed at a location. Similarly, if there is a problem with the opto-electronic transceiver 158, it can be easily replaced without having to replace the entire fiber optic cable 150 or to attempt to access the fiber optic cable (as with fiber optic cable 100) to repair or replace it.

As better depicted in FIG. 7, the independent module 162 has the opto-electronic transceiver 158 securely retained inside an outer housing 170. The outer housing 170 preferably has a shroud 172 that rotates relative to the outer housing 170. The shroud 172 preferably has a threaded portion 174 that engages a complementary threaded portion in interface 166. To engage the opto-electronic transceiver 158 in the fiber optic cable 150, the opto-electronic transceiver 158 is aligned with the connections in the interface 166 and the shroud 172 is rotated relative to the housing 170 and the fiber optic cable 150 to secure the opto-electronic transceiver 158 within the interface 166.

Figure 8:
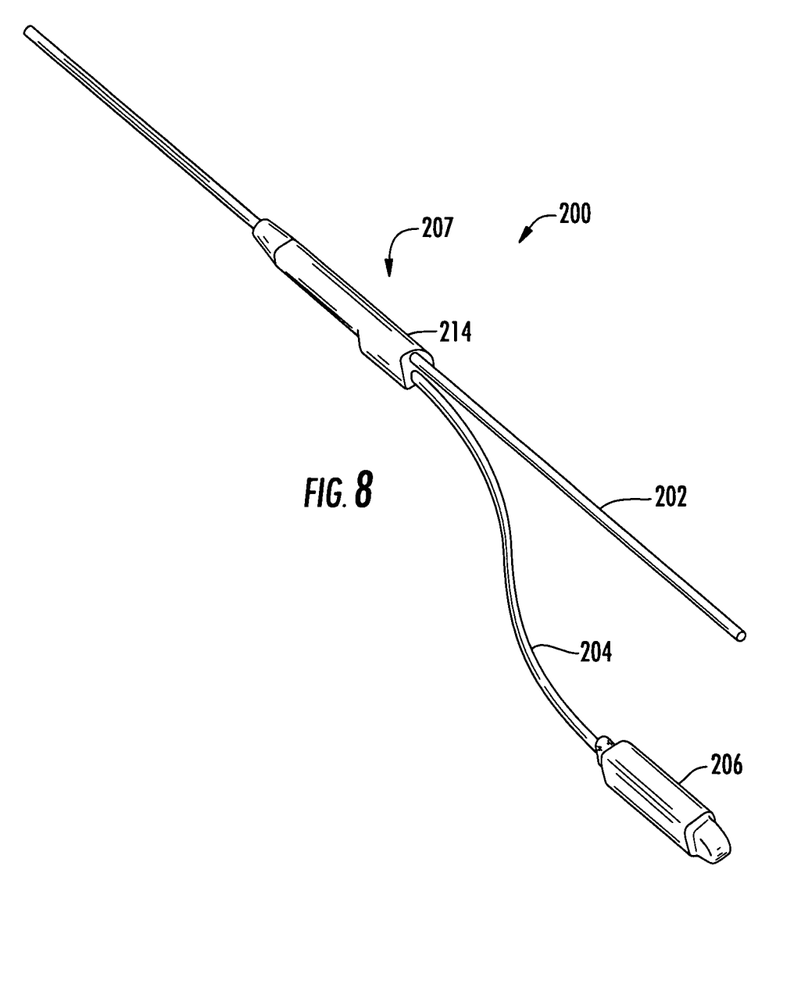
FIG. 8 is a perspective view of an embodiment of a fiber optic cable assembly according to the present invention.
Figure 9:
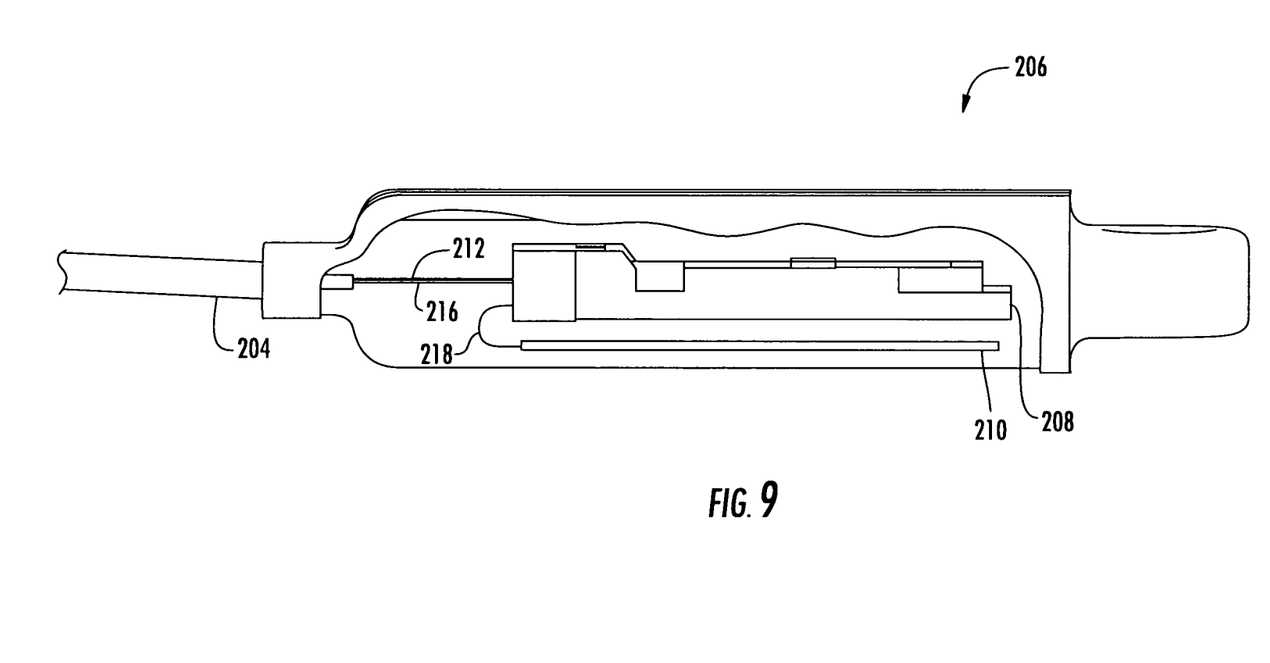
FIG. 9 is a partial cross sectional view of one portion of the portion of the fiber optic cable assembly of FIG. 8.

A fiber optic cable assembly 200 according to the present invention is illustrated in FIGS. 8 and 9. The fiber optic cable assembly 200 includes a fiber optic cable 202 and at least one tether 204 that connects a module 206 to the fiber optic cable assembly 200 and a connection point 207. It should be noted that the fiber optic cable assembly 200, while called an assembly in this embodiment, only differs from the prior embodiments in that the module 206, which includes an opto-electronic transceiver 208 and at least one RF antenna 210, is attached to the fiber optic cable 202 by a tether 204 rather than directly to the cable in an over-molded portion. The fiber optic cable assembly 200 also preferably includes a number of tethers 204 and modules 206 at a number of connection points 207, rather than just the one that is depicted in FIGS. 8 and 9. As with the prior embodiments, the number of optical fibers present in the fiber optic cable 202 is related to the number of modules 206 (and opto-electronic transceivers 208) present in the assembly 200.

The module 206 preferably includes the opto-electronic transceiver 208, which is attached to the optical fibers in the fiber optic cable by optical fibers 212 in the tether 204. The optical fibers 212 are preferably spliced onto the optical fibers in the fiber optic cable 202 before the over-molded portion 214 is applied to the fiber optic cable assembly 200. The optical fibers 212 may be connected to the opto-electronic transceiver 208 in any conventional manner (i.e., spliced, with optical ferrules, or optical connectors). The opto-electronic transceiver 208 is also provided power by connecting the electrical conductors 216 in the tether 204, which are connected to opto-electronic transceiver 208, to the electrical conductors in the fiber optic cable 202.

RF antenna 210 is electrically connected to the opto-electronic transceiver 208 in a conventional manner, such as by the connection 218 using a coaxial cable and connectors.

The over-molded portion 214 in this embodiment also preferably provides structural integrity to and seals the fiber optic cable assembly. As was illustrated in the prior embodiments, the over-molded portion secures and protects the connections between the optical fibers in the fiber optic cable 202 and the optical fibers 212 in the tether 204 as well as the connections between the conductors 216 and the conductors in the fiber optic cable 202. In an alternative embodiment, the RF antenna 210 can be disposed in the over-molded portion 214 rather than in the module 206. As would be recognized by one of skill in the art, the connection between the opto-electronic transceiver 208 and the RF antenna 210 would also pass through the tether 204.

Figure 10:
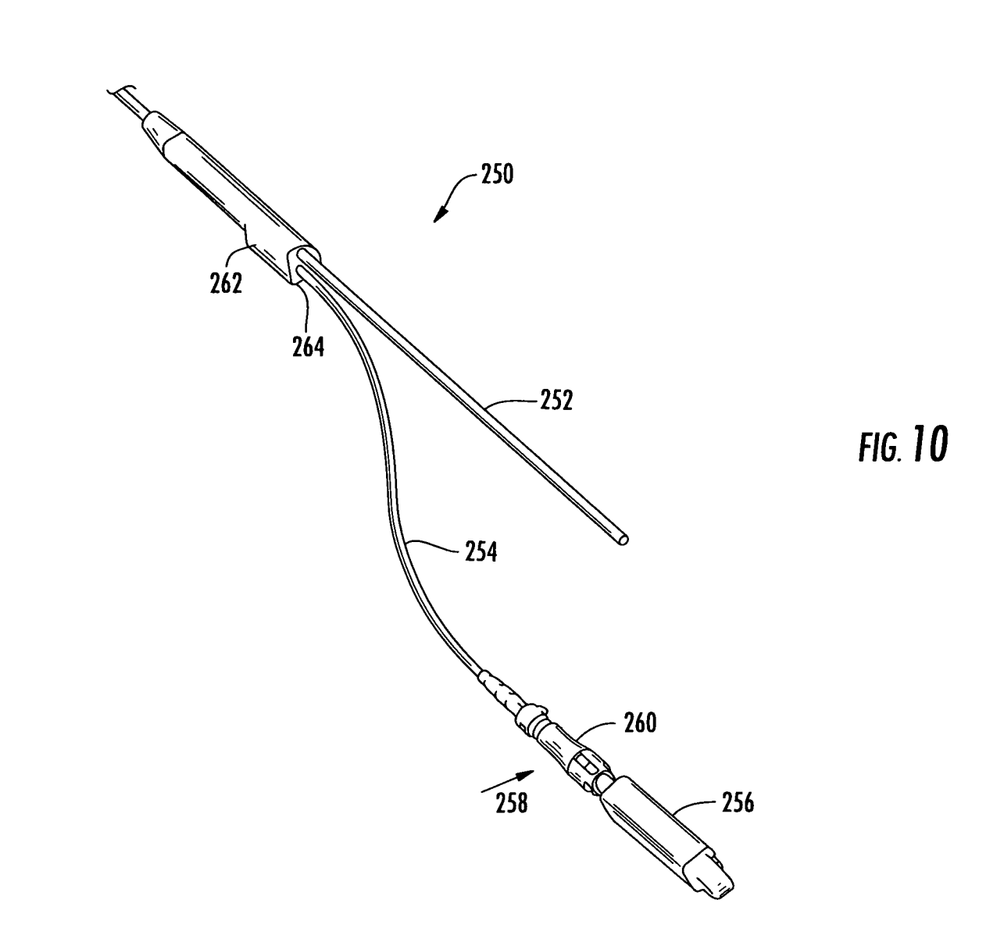
FIG. 10 is a perspective view of another embodiment of a fiber optic cable assembly according to the present invention.
Figure 11:
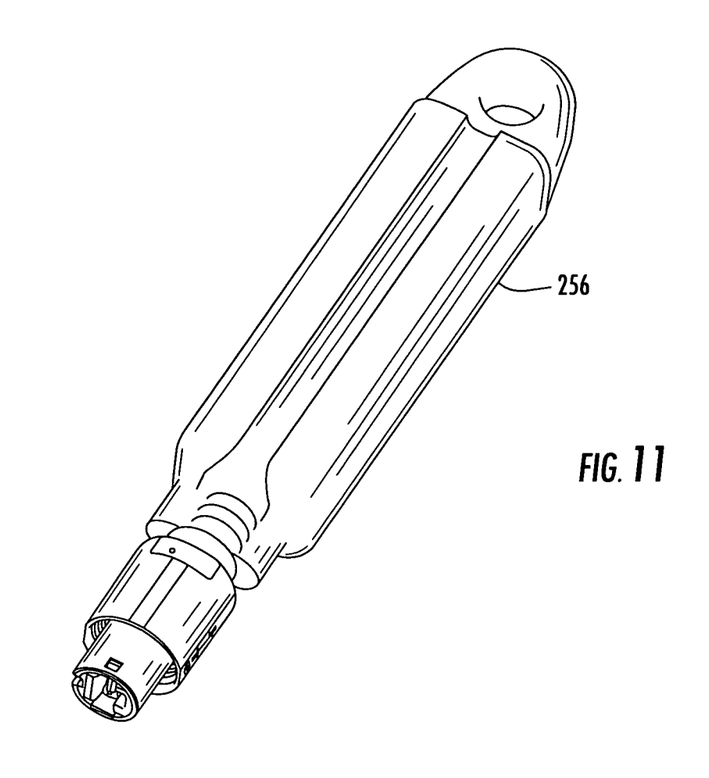
FIG. 11 is an enlarged view of one portion of the fiber optic cable assembly of FIG. 10.

Another embodiment of a fiber optic cable assembly 250 is illustrated in FIGS. 10 and 11. The fiber optic cable assembly 250 includes a fiber optic cable 252 and at least one tether 254 that connects a module 256 to the fiber optic cable assembly 250. In this embodiment of the present invention, the module 256 is preferably removable from the tether 254. The tether 254 preferably has attached at its end 258 a multi-connection connector 260. The connector 260 preferably allows for the optical fibers and electrical conductors in the tether 254 to be operatively connected to the opto-electronic transceiver (not visible) disposed in module 256. In the preferred embodiment, the RF antennas (not visible) are preferably disposed in the module 256 with the opto-electrical transceiver. However it is also possible that the RF antenna can be disposed in the over-molded portion 262 rather than in the module 156. In such an arrangement, connector 260 would also have a connection point to operatively connect the RF antenna in the over-molded portion 262 to the opto-electronic transceiver in the module 256. It should also be noted that the removable connector could be at the other end 264 of the tether 254. That is, the connector 260 could be plugged into an interface in the over-molded portion 262 (similar to the interface 164 in FIG. 5) and the tether 254 would connected to the module as illustrated in embodiment in FIG. 8.

It should be noted that the electrical conductors, while being disclosed in the same sheath/cable covering as the optical fibers, may also be in a separate sheath/cover as in FIG. 4 for any of the embodiments of the present invention.

Figure 12:
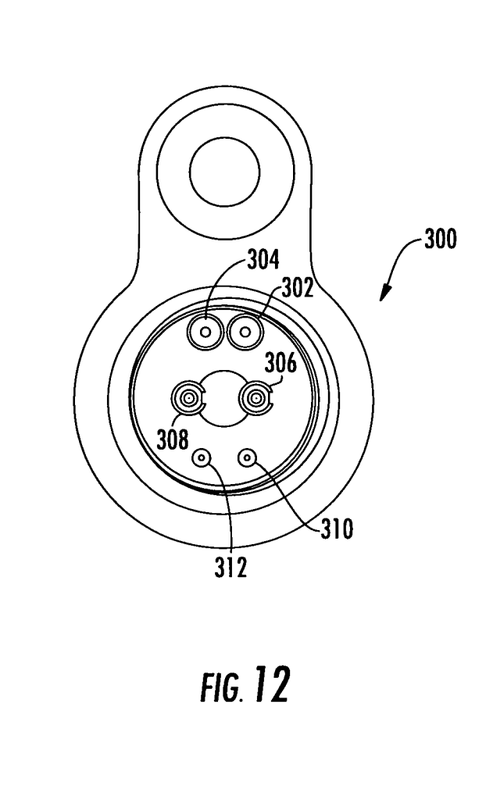
FIG. 12 is an end view of one side of a multi-functional interface that may be used with the present invention.

FIG. 12 illustrates one embodiment of a jack 300 for use in a multi-functional interface according to the present invention. The jack 300 preferably has two coaxial connections 302, 304, two optical connections 306, 308, and two electrical connections 310, 312. The jack 300 could be used with the fiber optical cable 150, as an example, and, further, may be disposed in the interface 166. The two coaxial connections 302, 304 are preferably connected to the RF antennas (e.g. 114, 160) or any other device that requires connections using coaxial cables and coaxial connections. The two optical connections 306, 308 are preferably connected, in one embodiment, to the optical fibers in a fiber optic cable, such as fiber optic cable 150. In a preferred embodiment, the optical connections 306, 308 are preferably optical ferrules having a polished end face. The two electrical connections 310, 312 are preferably connections for low voltage power, which in one preferred embodiment provides power to an electronic device, such as the opto-electronic transceiver 158 that is disposed in module 162. While a specific geometry of the jack 300 is illustrated in FIG. 12, any appropriate geometry and/or configuration of the connections is possible and falls within the scope of the present invention. For example, there may be more or fewer connections and the connections may be distributed in a different layout (e.g., the optical connections may be above the coaxial connections). The connections may also be female, male or even hermaphroditic in form.

Figure 13:
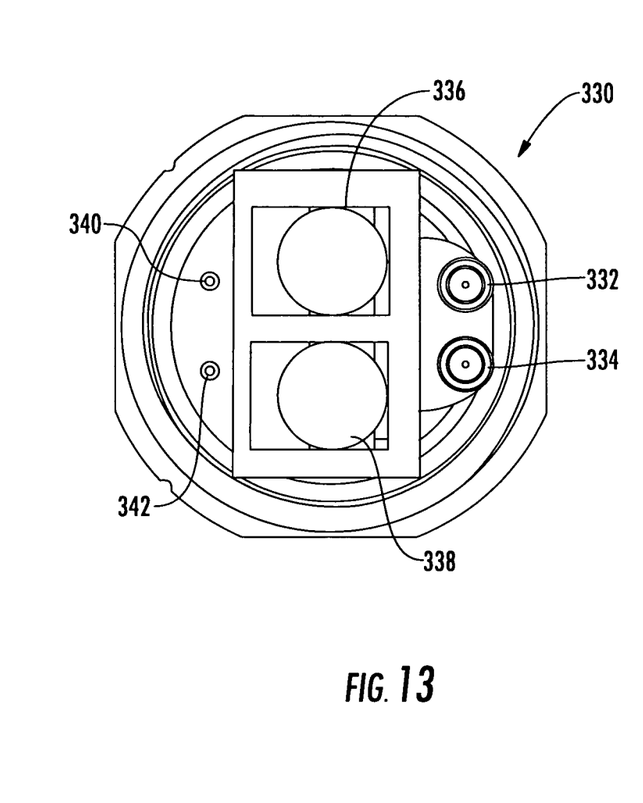
FIG. 13 is an end view of another side of a multi-functional interface that mates with the interface of FIG. 12 and may be used with the present invention.

FIG. 13 illustrates one embodiment of an plug connector 330 for use in a multi-functional interface and that preferably mates with the jack 300 according to the present invention. The plug connector 330 is illustrated in FIG. 13 as being used with module 162 of fiber optic cable 150 is but one example. The plug connector 330 preferably has two coaxial connections 332, 334, two optical connections 336, 338, and two electrical connections 340, 342. As with the jack 300 above, the number, location, and form of the connections may be altered for any particular use, but it is preferable that the connections in the plug connector 330 are aligned with and cooperate with the connections in the jack 300. The connections in plug connector 330 preferably mate with the connections in jack 300 in the following manner: the two optical connections 306, 308 are preferably connected to the two optical connections 336, 338, respectively; the two optical connections 306, 308 are preferably connected to the two coaxial connections 332, 334, respectively; and the two electrical connections 310, 312 are preferably connected to two electrical connections 340, 342, respectively. Not all of the connections need to be active at all times. Naturally, the jack 300 could be disposed in the module 162 and the plug connector 330 could be disposed in the interface 166, rather than as illustrated in the figures. The jack 300 and the plug connector 330 may also be independent form factors and not associate with any particular element or any of the structures associated with the fiber optic cable of the present invention. While the term "jack" has been used for element 300 and "plug connector" used for element 330, these terms by themselves are not intended to imply any particular structure, form, or function.

It will be apparent to those skilled in the art that various modifications and variations can be made in the fiber optic cable and assembly of the present invention without departing from the spirit or scope of the invention. Thus, it is intended that the present invention cover the modifications and variations of this invention provided they come within the scope of the appended claims and their equivalents.

That which is claimed is:

1. A fiber optic cable assembly for connecting to one or more external opto-electrical components, comprising:
    a single fiber optic cable having a length and a plurality of optical fibers disposed within and extending along at least a portion of the fiber optic cable;
    at least two electrical conductors disposed within and extending along at least a portion of the fiber optic cable;
    at least one mid-span connection point formed in the single fiber optic cable and traversed by at least one of the optical fibers;
    at least one external optical fiber portion comprised of at least one portion of the at least one of the optical fibers made external to the fiber optic cable; and
    external electrical conductor portions comprised of respective portions of the at least two electrical conductors made external to the fiber optic cable;
    wherein said at least one external optical fiber portion and said external electrical conductor portions are configured to optically and electrically connect at least one of the one or more opto-electrical components to the fiber optic cable; and
    wherein the one or more opto-electrical components are attached to the fiber optic cable by a tether.

2. The fiber optic cable assembly according to claim 1, wherein the mid-span connection point includes a connection point for an RF antenna that connects to the opto-electrical component when the opto-electrical component is connected to the mid-span connection point via said at least one external optical fiber portion and said at least two external electrical conductor portions.

3. The fiber optic cable assembly according to claim 1, further comprising at least one opto-electrical component connected to the at least one mid-span connection point via said at least one external optical fiber portion and said at least two external electrical conductor portions, wherein the at least one opto-electrical component includes an opto-electrical transceiver.

4. (Previously Presented The fiber optic cable assembly according to claim 1, wherein the tether is at least 6 inches long.

5. The fiber optic cable assembly according to claim 3, wherein, at one or more of the mid-span connection points, said at least one external optical fiber portion, said at least two external electrical conductor portions, and said at least one external opto-electrical component are secured to the fiber optic cable via an overmold.

6. The fiber optic cable assembly according to claim 1, wherein the tether further includes the at least one portion of the at least one of the optical fibers and the respective portions of the at least two external electrical conductors.

7. The fiber optic cable assembly according to claim 1, wherein the independent module further includes a jack configured to connect the one or more opto-electrical components to the at least one portion of the at least one of the optical fibers and the respective portions of the at least two external electrical conductors.

8. A fiber optic cable assembly for connecting to one or more external opto-electrical components, comprising:
    a single fiber optic cable having a length and a plurality of optical fibers disposed within and extending along at least a portion of the fiber optic cable;
    at least two electrical conductors disposed within and extending along at least a portion of the fiber optic cable; and
    at least one mid-span connection point formed in the single fiber optic cable and traversed by at least one of the optical fibers, wherein at least one portion of the at least one of the optical fibers and respective portions of the at least two electrical conductors are made external to the fiber optic cable and configured to optically and electrically connect at least one of the one or more opto-electrical components to the fiber optic cable;
    wherein the one or more opto-electrical components are provided in an independent module that is separable from the fiber optic cable assembly.

9. The fiber optic cable assembly according to claim 8, wherein the independent module further includes an outer housing to retain the one or more opto-electrical components.

10. The fiber optic cable assembly according to claim 8, wherein the independent module further includes a jack configured to connect the one or more opto-electrical components to the at least one portion of the at least one of the optical fibers and the respective portions of the at least two external electrical conductors.

* * * * *